United States Patent [19]

Christensen

[11] 4,134,616
[45] Jan. 16, 1979

[54] SEAT COVER

[76] Inventor: George L. Christensen, 624 N. First W., Tremonton, Utah 84337

[21] Appl. No.: 865,604

[22] Filed: Dec. 29, 1977

[51] Int. Cl.² .............................................. A47C 31/10
[52] U.S. Cl. ..................................... 297/188; 297/229
[58] Field of Search ............... 297/219, 229, 224, 226, 297/188, 192

[56] References Cited

U.S. PATENT DOCUMENTS

| | | | |
|---|---|---|---|
| 1,771,872 | 7/1930 | Brock et al. | 297/224 |
| 2,792,055 | 5/1957 | O'Neil | 297/188 |
| 2,822,862 | 2/1958 | Zacks | 297/229 |
| 3,220,768 | 11/1965 | Bird | 297/229 X |
| 3,295,887 | 1/1967 | Bacon | 297/188 |

Primary Examiner—Francis K. Zugel
Attorney, Agent, or Firm—Edward E. McCullough

[57] ABSTRACT

A rectangular, coarse-weave blanket is folded upon itself at one edge to form a pocket, which is sewn into that position at the ends and, optionally, at intermediate locations. A long tube of leather, or other flexible material, is fastened at one side to the underside of the pocket, and is to be arranged along the front edge of an automobile seat. This forms a scabbard for storing a hunting gun. Two slits, one on each edge of opposite sides of the blanket, divide it into a cover for the seat cushion and a cover for the back cushion. Each slit is reinforced with decorative piping that forms a pair of loops at the outer corners of each slit. The same kind of piping is sewn to the edge of the pocket and extends beyond it at each end for fastening the blanket to structural members of an automotive vehicle seat and for forming corners therein. In a similar manner, the back portion of the blanket is fastened to the back seat cushion by a drawstring laced repeatedly through the edge of the back seat portion of the blanket. Each end of the drawstring is passed through the adjacent loop in the back cushion side of the blanket, pulled taught, and fastened to structural members of the seat.

8 Claims, 3 Drawing Figures

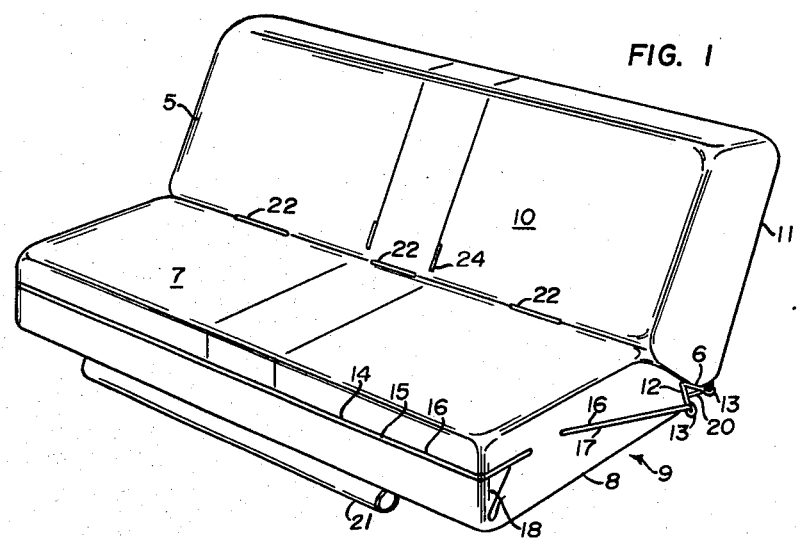
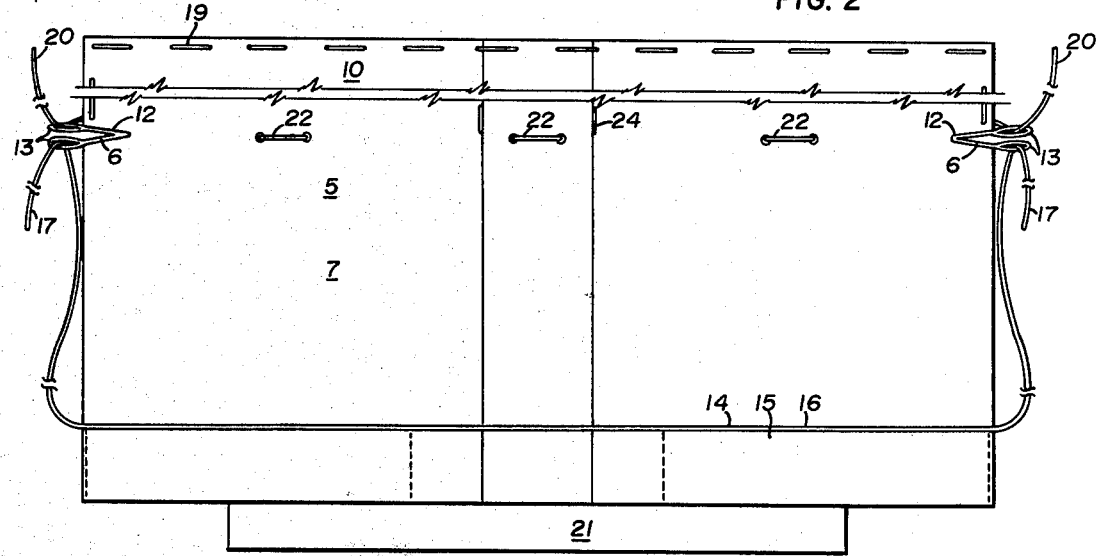
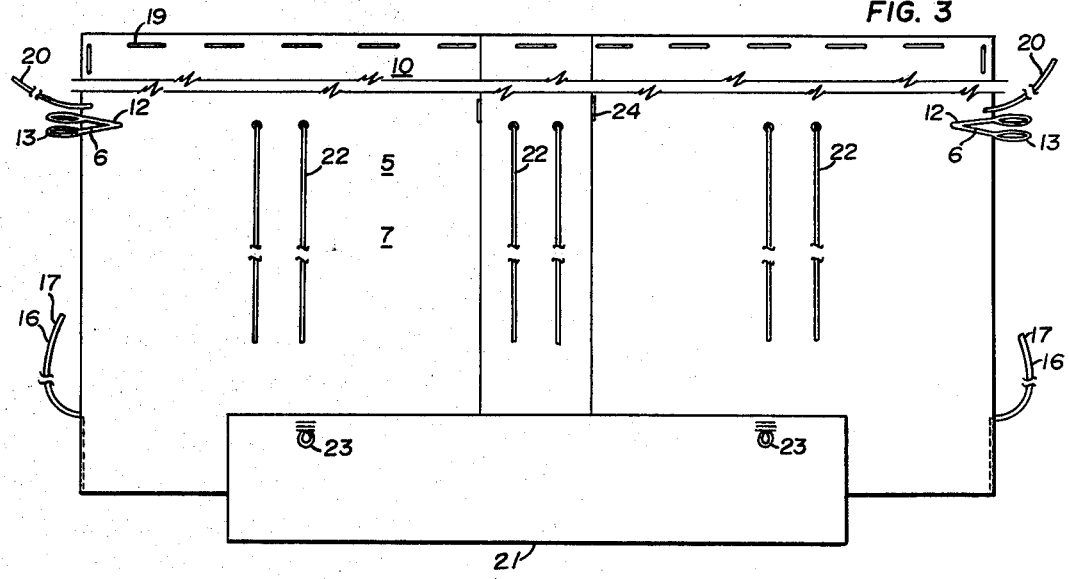

SEAT COVER

BACKGROUND OF THE INVENTION

This invention relates broadly to seat covers. More specifically, it relates to removable seat covers for seats of automotive vehicles, and for decorative fastening means therefor.

A popular type of cover for seats of automotive vehicles is basically a coarse-weave blanket made of indeterminate fibers, i.e., any mixture of fibers usually left over as surplusage from other manufacturing operations. Such material has traditionally been used for horse-saddle blankets.

When used as an automotive vehicle seat cover, it is desirable that it be useful as a cover for a considerable variety of sizes and shapes of vehicle seats. Hence, it is made rectangular, and is provided with means for fastening it to structural members of the seat and for causing the blanket to conform to the shape of the seat. Heretofore, such fastening means have been primarily in the form of eyelet tabs sewn to the edges of the blanket. Cords or ropes passed through the eyelets were then attached to structural members of the seat.

Major problems with this type of fastening means are that the tabs tend to detract from the appearance of the seat cover, and that they also tend to be rather easily torn off. Another problem is that it is difficult to form neat corners in the flat, rectangular blanket that conform to those of the vehicle seat.

SUMMARY OF THE INVENTION

An object, therefore, of the invention is to overcome these difficulties of the prior art by providing an automotive vehicle seat cover that has decorative means for fastening it to an automotive vehicle seat. Another object is to provide attachment means that cannot easily become detached from the blanket. Another object of the invention is to provide a seat cover having fastening means that may be used quickly and conveniently. Another object of the invention is to provide a seat cover having means for fastening it to the seat structure that automatically forms neat corners in the cover that conform to those of the seat.

The invention is essentially a rectangular blanket of coarse weave, made of indeterminate fibers. Two slits, one in each side thereof, separate the blanket into a forward cover for the seat cushion of an automotive vehicle seat and a back cover for the back cushion. The edges of the slits are reinforced by a decorative piping that forms loops at the outer corners of the slits. The front edge of the forward portion of the blanket is folded upon itself to form a pocket, and is sewn in that position at the ends, and, preferably, also in intermediate locations.

A long tube of flexible material, for storing a hunting gun, is attached to the underside of the pocket.

A decorative piping, fastened to the edge of the pocket, extends beyond the pocket at each end, and is used for attaching the blanket to structural members of a vehicle seat. First, however, the ends of the piping are passed through adjacent portions of the blanket to form and hold neat corners therein that conform to those of the seat cushion. They are formed by folding the corners of the blanket upon itself. The piping ends are also passed through the adjacent loops of piping at the corners of the slits, before being attached to the seat structure.

A drawstring is laced into the edges of the back portion of the blanket, and the free ends thereof are also passed through the adjacent loops at the corners of the slits before being attached to the seat structure of a vehicle.

Objects and advantages of the invention, in addition to those cited above, will be noted as the following, detailed description is read with reference to the drawings. The same numbers refer to the same parts throughout the disclosure.

BRIEF DESCRIPTION OF THE DRAWINGS

In the drawings:

FIG. 1 is a perspective view of the invention, installed on a typical automobile seat;

FIG. 2 is a flat view of the invention, removed from the automobile seat; and

FIG. 3 is similar to FIG. 2, but shows the reverse side of the invention.

DESCRIPTION OF THE PREFERRED EMBODIMENTS

As shown in FIG. 2, the invention is basically a heavy, rectangular blanket 5, made from commercially-available, coarse-woven material of indeterminate fibers, i.e., a mixture of available fibers ordinarily left over from other manufacturing operations.

The blanket 5 is divided by two slits 6, one in each of its opposite side edges, into a forward portion 7, for covering the seat cushion 8 of an automotive vehicle seat 9, and a back portion 10 for covering the back cushion 11 of the vehicle deat. In a preferred embodiment, these slits 6 are reinforced with a decorative, polypropylene rope or piping 12, attached to the edges thereof, that forms a pair of loops 13 at the outer corners of each slit 6.

The front edge 14 of the forward portion 7 of the blanket 5 is folded back upon itself and sewed at the ends, and, optionally at intermediate locations, to form at least one long pocket 15. This front edge 14 is also reinforced with a decorative, polypropylene rope or piping 16 that is attached thereto and has free ends extending well beyond the ends of the pocket 15 for attaching the blanket to structural members of the seat 9. As shown in FIG. 1, this is done by folding the ends of the pocket 15 upon adjacent material of the blanket 5 to form corners 18 that conform to those of the seat cushion 8. Each end of the rope 16 is then passed through adjacent material of the blanket 5 to hold the corners 18 in their respective positions. Then the ends of the rope are passed through corresponding loops 13 before being attached to structural members of the seat 9, such as the springs thereof (not shown). The decorative, polypropylene pipings 12 and 16 could be made of many other materials, such as Nylon, hemp, polyesters, etc.

A long drawstring 19 is laced into the edges of the back portion 10 of the blanket 5, leaving long, free ends 20 that are passed through the adjacent loops 13. The back portion 10 of the blanket 5 is then arranged on the drawstring 19 to fit the back seat cushion 11, after which the free ends 20 of the drawstring 19 are also attached to structural members (not shown) of the vehicle seat 9. A preferred material for the drawstring 19 is Nylon, however, many other materials could be used, such as polypropylene and polyester.

A long tube 21 is attached along one side thereof to the underside of the pocket 15, to form a scabbard for storage of a long, hunting gun, such as a shotgun or rifle. This tube 21 is made of a flexible material, preferably leather. However, nearly any tough, flexible material could be used for this purpose.

A pair of intermediate laces 22, each passed through the blanket 5 between the slits 6, are then passed beneath the automobile seat cushion 8 and through the loops 23 on the scabbard 21. Then the laces 22 are fastened to themselves or to structural members of the seat. This causes the blanket 5 to fit snugly between the seat cushions, and anchors it firmly to the seat cushion 8. Also, the blanket 5 may contain slits 24 for passage of seat belts.

It has been found that the seat cover made according to the foregoing description is easy to install, conforms neatly to the contours of an automotive vehicle seat, and withstands daily use very satisfactorily.

An invention has been described that provides an advance in covers for automotive vehicle seats. Although the embodiments have been described specifically with regard to detail, it should be noted that many details may be altered without departing from the scope of the invention, as it is defined in the following claims.

The invention claimed is:

1. In a seat cover for covering an automotive vehicle seat that has a seat cushion and a back cushion, the seat cover comprising a rectangular blanket folded upon itself at one edge and fastened to form at least one pocket to be arranged along the front edge of the seat cushion, while a forward portion of the remainder of the blanket is arranged to cover the seat cushion and a back portion thereof to cover the back cushion,
a piping attached to the edge of the blanket which forms the top of the pocket and extending beyond it at each end for attachment to structural members of an automotive vehicle seat; and
means for attaching the back portion of the blanket to a back cushion of an automotive vehicle seat.

2. The seat cover of claim 1 wherein the means for attaching the back portion of the blanket to a back cushion of an automotive vehicle seat is a drawstring that is repeatedly laced through the edge of the back portion of the blanket, each end of the drawstring extending from the blanket adjacent the forward portion thereof, for attachment to structural members of a seat of an automotive vehicle.

3. The seat cover of claim 1 wherein the back portion and the forward portion of the blanket are separated by a pair of slits, one in each opposite side edge thereof, and further including a piping attached to the edge of each slit, for decorative reinforcement thereof, and a pair of loops formed at the outer corners of each slit by the piping, through which the ends of the drawstring and of the piping of the pocket are passed prior to their attachments to structural members of an automotive vehicle seat.

4. The seat cover of claim 1 further including an elongated tube of flexible material attached along the side thereof to the underside of the pocket, for storage of a hunting gun.

5. The seat cover of claim 1 wherein the piping is made of polypropylene fibers.

6. The seat cover of claim 1 wherein the blanket is made of indeterminate fibers.

7. The seat cover of claim 1 wherein the blanket material adjacent the end portion of each pocket is folded upon itself to form a corner to conform to each of the front corners of an automotive vehicle seat cushion, and is held in that position by the free ends of the piping, which are passed through the blanket material and pulled taught through adjacent loops, for attachment to structural members of an automotive vehicle seat.

8. A seat cover for covering a seat cushion and a back cushion of an automotive vehicle seat comprising:
a rectangular blanket having front, side and back edges, wherein the front edge is folded upon itself and fastened at the ends to form a pocket, the blanket also having a pair of slits, one in each side edge to divide the blanket into a forward portion and a back portion;
edge-reinforcing material fixed to the edges of the slits and forming a pair of loops on the outer corners of each slit;
a drawsting laced into the edges of the back portion of the blanket and having its free ends passed through the adjacent loops, for fastening to structural members of an automotive vehicle seat;
a piping fastened to the front edge of the blanket which forms the top of the pocket and having free ends extending beyond the pocket and passed through adjacent material of the blanket and through adjacent loops for fastening to structural members of an automotive vehicle seat;
a tube of flexible material attached along one side to the underside of the pocket for storage of a hunting gun;
a pair of laces, each passed through the intermediate portion of the blanket between the slits; and
a pair of loops on the back side of the tube, for attachment of the laces.

* * * * *